(No Model.)
F. VEITH.
VALVE APPARATUS.
No. 589,878. Patented Sept. 14, 1897.
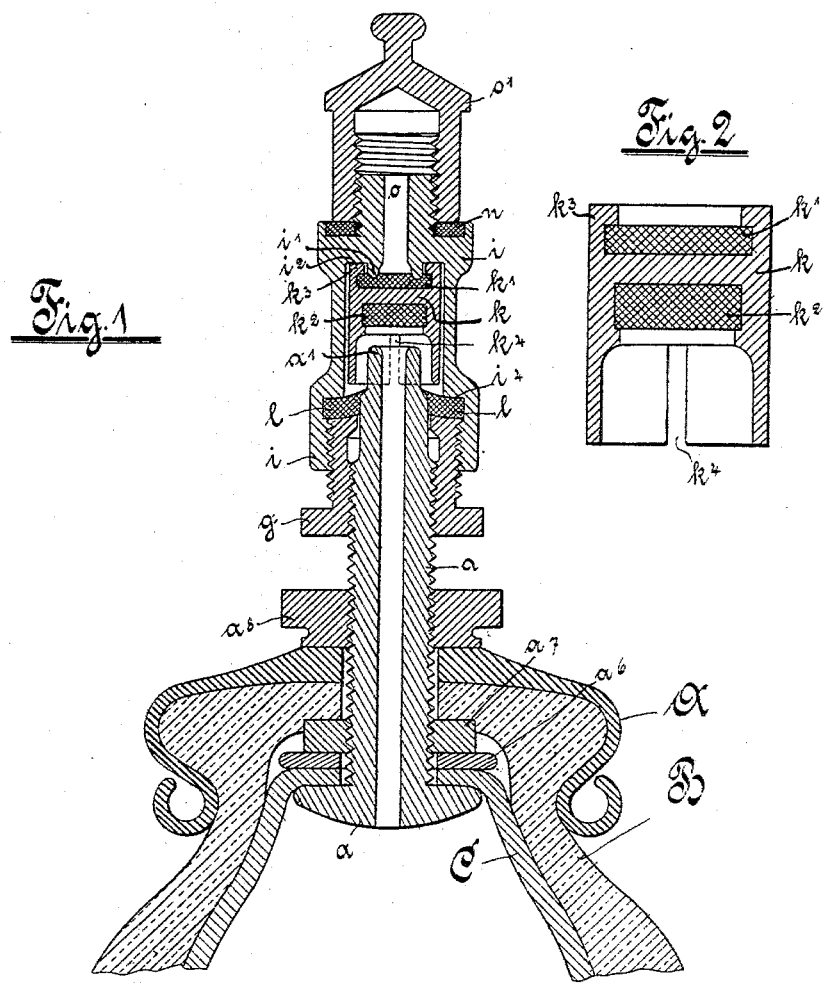
Witnesses:
L. M. Wachschlager,
Geo. Ellison
Inventor
Friedrich Veith
By Briesen & Knauth
his Attorneys.

UNITED STATES PATENT OFFICE.

FRIEDRICH VEITH, OF OFFENBACH-ON-THE-MAIN, GERMANY.

VALVE APPARATUS.

SPECIFICATION forming part of Letters Patent No. 589,878, dated September 14, 1897.

Application filed March 1, 1897. Serial No. 625,632. (No model.)

*To all whom it may concern:*

Be it known that I, FRIEDRICH VEITH, a subject of the German Emperor, residing at Offenbach-on-the-Main, Germany, have invented certain new and useful Improvements in Valve Apparatus, of which the following is a specification.

My invention relates to valve apparatus, and has for its object to produce valve apparatus especially adapted for stopping the aperture in a pneumatic tire so as to provide an arrangement for sealing up the tire which will not, as heretofore, require a large puncture or hole to be made in the tire.

To this end my invention consists in the construction and arrangement hereinafter set forth and claimed.

My invention will be understood by referring to the accompanying drawings, in which—

Figure 1 is a section through a valve apparatus embodying my invention, showing the same applied to a tire. Fig. 2 is an enlarged section showing the valve proper.

In the drawings, A represents the wheel-rim, within which may be placed an outer tire B, inclosing the inner tire or flexible envelop C, which is pierced for the passage of a small-sized screw-threaded stem $a$, which is headed and may have on the outside thereof a washer $a^6$ and nut $a^7$ for holding the stem in the flexible envelop C. A nut $a^3$ may also be provided for screwing upon the stem $a$ to hold the said stem rigidly in the wheel-rim A. Carried upon the screw-threaded stem $a$ and screw-threaded internally and externally is a sleeve $g$, upon which is screwed a sleeve $i$, having a shoulder $i^4$, between which and the top of the sleeve $g$ a rubber packing or washer $l$ is located, which packing or washer surrounds the smooth portion of the stem $a$. The end of the stem $a$, as shown, projects upward into the sleeve $i$ and is formed at its end into a valve-seat $a'$. Encircling the valve-seat or end $a'$ of the stem $a$ is a valve $k$, shown clearly in Fig. 2 as H-shaped in vertical cross-section, and cupped at the bottom to receive a yielding packing $k^2$, and slitted at $k^4$ for the entry of air at the proper time, and at its upper side cupped to receive a yielding packing $k'$, which is shown as lying within the upturned rim $k^3$. The packing $k^2$ is intended to rest upon the valve-seat of the stem $a$ when the parts are screwed together, as will be readily understood. The sleeve $i$ is provided at its upper portion with a downwardly-projecting rib or annular rim $i'$, which is adapted to fit within the rim $k^3$ of the valve $k$ and has between itself and the wall of the sleeve $i$ an annular recess $i^2$. The sleeve $i$ is surmounted by a screw-threaded nipple, upon which a cap $o'$ may be placed when the valve has been tightened to prevent the escape of air from the tube, the said cap resting upon a packing $n$, laid in an annular space in the top of the sleeve $i$. It will be obvious from the foregoing that a considerable-sized valve may be placed upon the small stem $a$, and by screwing together the parts $g$ and $i$ the packing $l$ will be firmly squeezed between the shoulder $i^4$ of the sleeve $i$ and the top of the sleeve $g$, and the sleeve $i$, descending, will enter its rim $i'$ within the rim $k^3$ and force the cup-shaped valve $k$ down upon its seat on the top of the stem $a$, the rim $k^3$ entering the annulus $i^2$, so that the tire will be securely sealed by this valve.

What I claim, and desire to secure by Letters Patent, is—

In a valve apparatus, the combination of a hollow stem $a$ terminating in a valve-seat $a'$, a sleeve $i$ provided with an annular rib $i'$ located opposite to and extending toward valve-seat $a'$, the said sleeve $i$ being movable longitudinally over the stem, and a valve $k$ recessed on one side for the reception of a packing $k^2$ and adapted to coöperate with the valve-seat $a'$ and provided at its other side with a rim $k^3$ inclosing the packing $k'$, the said valve being located between the valve-seat $a'$ and the rim $i'$, so that when the sleeve $i$ is moved longitudinally over the stem $a$, the rim $i'$ will enter within the rim $k^3$ on the valve and force the valve down upon its seat $a'$ on the hollow stem $a$, substantially as described.

FRIEDRICH VEITH.

Witnesses:
 DEAN B. MASON,
 FRANK H. MASON.